No. 868,356. PATENTED OCT. 15, 1907.
T. MULALLY.
CULTIVATOR.
APPLICATION FILED NOV. 2, 1905.
2 SHEETS—SHEET 1.
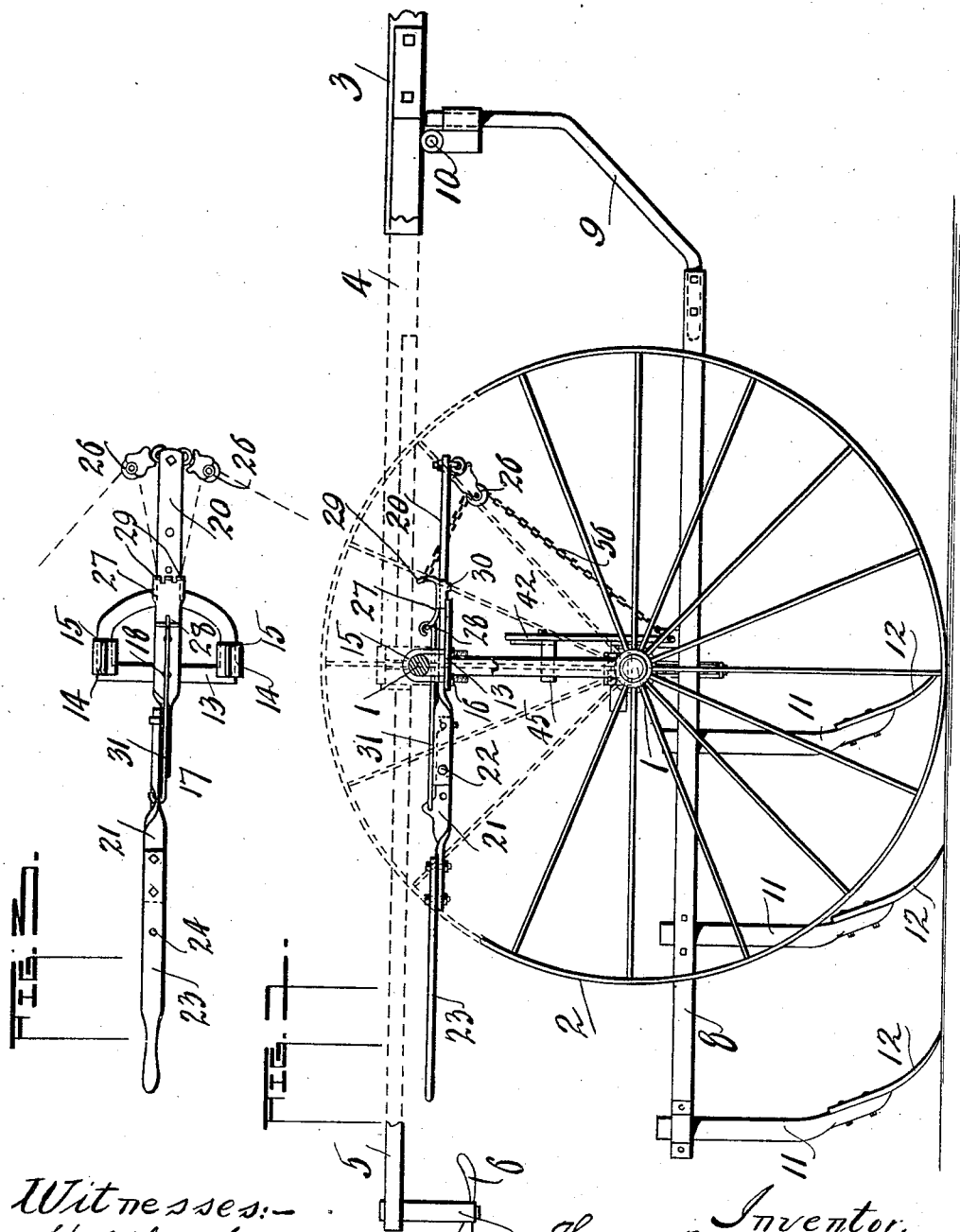
Witnesses:
H. V. Gibson
J. M. Anderson
Inventor.
Thomas Mulally,
By Chas. W. LaPorte Atty.

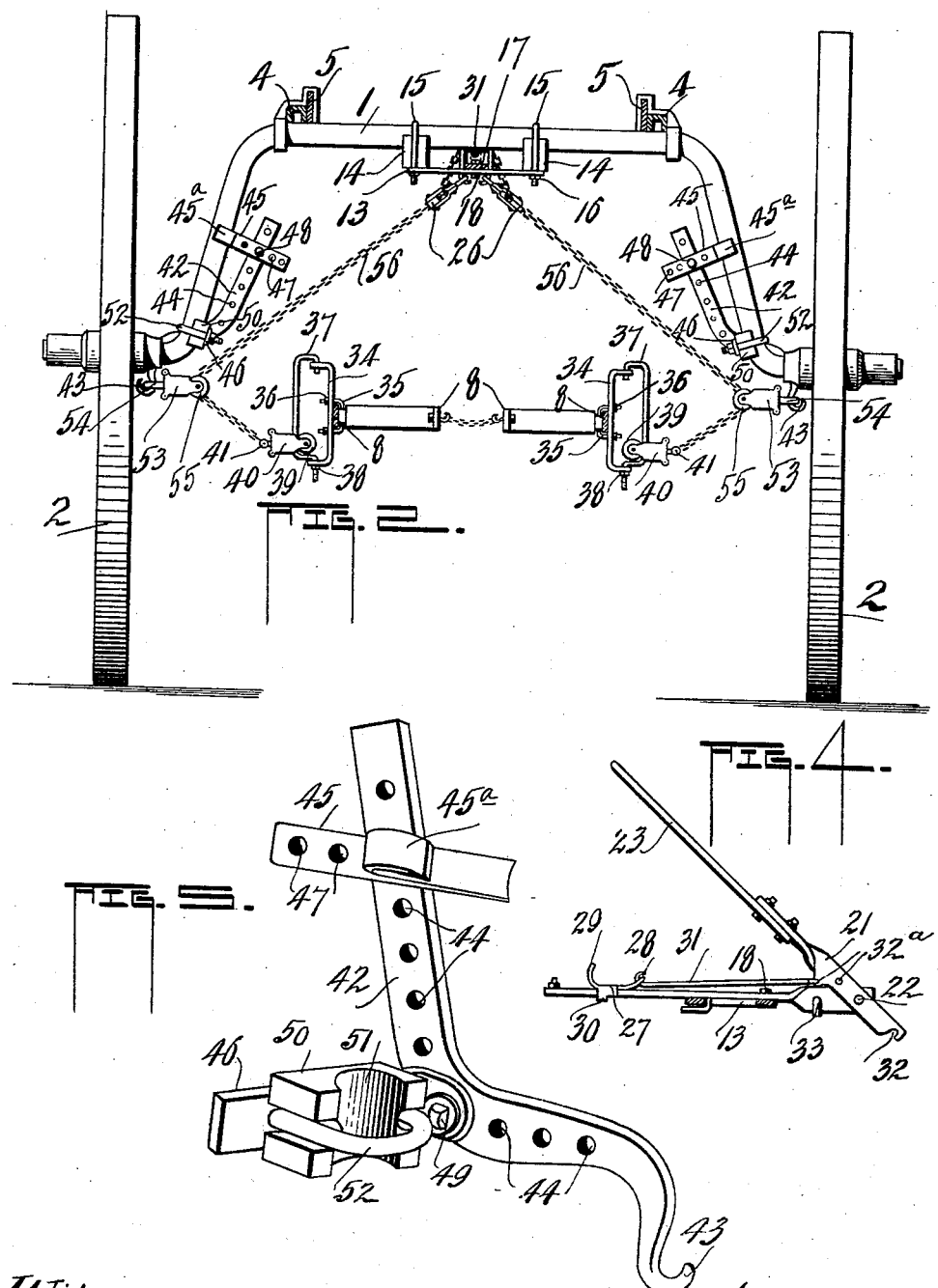

UNITED STATES PATENT OFFICE.

THOMAS MULALLY, OF PRINCEVILLE, ILLINOIS.

CULTIVATOR.

No. 868,356.   Specification of Letters Patent.   Patented Oct. 15, 1907.

Application filed November 2, 1905. Serial No. 285,511.

*To all whom it may concern:*

Be it known that I, THOMAS MULALLY, a citizen of the United States, residing at Princeville, in the county of Peoria and State of Illinois, have invented certain new and useful Improvements in Cultivators; and I do hereby declare that the following is a full, clear, and exact description of the invention, which will enable others skilled in the art to which it appertains to make and use the same.
This invention has reference to new and useful improvements in cultivators, being adapted to be attached to disk, surface or shovel cultivators. The device in this instance is shown applied to a shovel cultivator.

The object of the invention is a guide lever having connection with the beams or gangs carrying the shovels, and the hand-hold of the lever within reach of an operator that he may, through the connection of the same with the gangs, control the several beams with one motion.
This application sets forth improvements upon the device shown, described and claimed in a patent issued to me on Feb. 7th, 1905, No. 781,841; and an application now pending for improvements in cultivators, Serial Number 255,000.
A further object of the invention is swiveled attachments suitably connected to the shovel beams, sheave wheels supported by said attachments, a pivoted lever and connections between the lever and the said sheave wheels.
The invention has for its further object a bracket secured to the axle of the cultivator, a lever pivoted to such bracket to adapt it to have horizontal swinging movement with portions of the lever extending forwardly and rearwardly of said axle, the rear portion of the lever being pivoted in its length to adapt the handle portion to be raised vertically; a pair of sheave wheels or pulleys connected to the front end of the said lever, and chains suitably connected to the lever and passing over the wheels aforesaid have their opposite ends suitably attached to the shovel beams, whereby when the lever is swung longitudinally corresponding movement will be imparted to the shovel beams.

The invention consists further of shovel beams; a lever composed of two sections pivoted together; a plate slidable on the forward section of the lever; a rod connected to the slidable plate and the rear folding section of the lever, and a plurality of chains connected to the slidable plate aforesaid and having their opposite ends connected to the shovel beams, the slidable plate and folding section of the lever adapted to allow slack in the chains aforesaid when raising the lever.

The invention has for its further object details of construction to be hereinafter more fully described in the specification, pointed out in the appended claims and illustrated in the accompanying drawings, forming a part of this specification, in which:

Figure 1 is a side elevation, with parts broken away and in section of so much of a well known form of cultivator as to illustrate my improvements attached thereto; Fig. 2 is a rear elevation, parts in section, of the cultivator shown in Fig. 1 and illustrating the bracket secured to the axle to which the lever is pivoted, the swiveled attachments connected to the shovel beams, the chains between the lever and swiveled attachments and adjustable supports on the axle supporting guide wheels for the chains; Fig. 3 is a detached view, showing in plan the lever and bracket to which the same is pivoted; Fig. 4 is a detached view in side elevation of the lever, showing the folding section of the lever swung upwardly; Fig. 5 is a detail in perspective of supports adapted to be secured to the axle, to which are attached guide wheels for the chains.

In the drawings, 1 denotes the ordinary arched axle used in practically all riding cultivators, on the opposite terminals of which are carried the ground wheels 2.

3 denotes a pole, to which are attached suitable single and double trees (not shown), and 4 denotes straps which are secured at their forward ends to the pole and at their inner ends fixedly attached to the arch of the axle 1, and 5 denotes additional frame parts which extend across the arch of the axle and have their forward ends secured to the straps 4 while their rear ends support a driver's seat 6, attached to a spring strap 7, the ends of which are secured to the rear ends of the frame parts 5.

8 denotes shovel beams which at their forward ends are attached to the rods 9, which have a swingable connection with a transverse rod 10 suitably supported under the pole. The beams 8 are of the usual construction and support the shanks 11, which at their lower ends carry the shovels 12.

In the drawings, I have shown the necessary frame parts and outline of a cultivator, that the application of the present improvements may be more readily understood. However, it is understood that no special claim is made upon any of the parts of the cultivator, such as the frame, beams or shovels, but to the attachments for controlling the said beams and shovels. Therefore it has not been thought necessary to show the means for raising and lowering the beams, nor other well known details which form a part of most every riding cultivator. The stirrup, particularly, being omitted as the devices of this improvement are intended to supplant the same.

13 indicates a bracket suspended from and beneath the arched axle 1 with an arched portion thereof disposed to the front of the axle. For securing the bracket to the axle, I employ two blocks 14 for spacing the bracket a short distance below the axle, and two U shaped bolts 15 which extend over the axle, down along side the blocks and through the bracket and retained in position by means of nuts 16.

Extending longitudinally of the cultivator beneath the center of the axle and above the bracket, is a lever 17 and said lever is pivoted at 18 to the bracket. The lever 17 consists preferably, of three sections; the forward section 20 which is pivoted to the bracket and extends forward and rearward of the axle; the rear section 21 which is pivoted at 22 to the first mentioned section to adapt the rear section to be swung from a horizontal position to a forwardly and vertically inclined position, for a purpose to be described, the said rear section having a handle portion 23 which is longitudinally adjustable on the section 21 to facilitate in lengthening or shortening the same to give more or less leverage, accomplished by the provision of perforations 24 in the handle portion 23. From the outer end of the section 20 is suspended a pair of guide rollers 26, and slidable on the said section 20 is a plate 27 having an eye 28 and the finger extensions 29. To adapt the plate to slide on the section 20 of the lever and yet prevent its dislodgment, I have shown the lips 30 which overlap the under side of the said lever section 20. Attached to the eye 28 of the sliding plate, is a rod 31, the opposite end of which is adapted to connect with one or the other perforation $32^a$ in the lever section 21, which will increase or decrease the movement of the sliding plate as the section 31 is swung forwardly through the connection of the rod 31 with the plate 27 and the said section 21 of the lever. To lock the position of the lever section 21 when in its lower or horizontal position and to prevent its disconnection from the section 20, other than by the operator, I have provided the hook 32 on the end of the section 21 which will engage a hook 33 on the section 20 of the lever, the advantages of such lever construction will be further set forth.

At a suitable point on the beams 8, as in the patent and application referred to, is secured a suitable strap 34 which is attached to the beams by means of the U shaped rods 35 which loop the beams substantially as seen in Fig. 2 and retained in place by nuts 36. To the said strap are swiveled the rods 37, which are detachably retained by nuts 38 engaging lower threaded ends of the said rods 37. And sliding up and down on the rods 37, are shown wheels 39 which are carried by castings 40, to which are also connected the swiveled eye bolts 41. The uses of the swiveled rods 37, together with the sheave wheels 39 slidable thereon, the castings supporting the same and eye bolts, will be further described in connection with the improvements herein.

42 denote bracket arms substantially L shaped and with a depending neck provided with a hook 43, the main body of the bracket having a series of perforations 44 as shown. It is adapted to support these bracket arms adjustably on the vertical portion of the axle 1. To do this, I provide the brackets 45 and 46; the former is provided with an inturned portion at the end of which is a semi-circular loop $45^a$ which is adapted to practically encircle the axle, while the main body of the said bracket is provided with a series of perforations 47, to adapt the attaching of the upper end of the bracket arms in an adjustable manner to the brackets 45, by means of bolts 48 or some other suitable securing means.

To the brackets 46, it is adapted to pivotally connect the body of the bracket arms 42 by means of a bolt 49, passed through one of the perforations 44 in the bracket arm 42 and through a corresponding perforation in the bracket 46. A block 50 having a semi-circular face 51, is employed for engaging the axle 1, and blocks 50 and bracket arms 42 are retained in connection with the axle by means of the U bolts 52, as shown. Thus, through the connections described, the bracket arms 42 may have their hooks 43 positioned closer to or farther from the wheels 2, by changing the position of the bolt 48 at the head of the bracket arms 42 and swinging the said bracket arms 42 on the bolt 49. The pivot of the bracket arm 42 on the bracket 46 may be changed by employing one or the other of the perforations 44 for the bolt 49 and the bracket arms may be raised or lowered on the axle by changing the position of the brackets 45 and 46, all of which it is believed is understood. To the hooked ends 43 of the bracket arms are connected castings 53 by means of eye bolts 54, swiveled to the said castings; the latter supporting the sheave wheels 55 as shown.

56 denote chains, which at their upper or inner ends are connected to the finger extensions 29 of the plate 27 and passing over the guide rollers 26, extend down and over the sheave wheels 55 and have their lower opposite ends secured to the eye bolts 41.

From the drawings, it will be seen that castings 53, through their eye bolts 54, have a swinging connection with the hooked ends of the bracket arms 42; also that the castings 40, through their sheave wheels 39, have a vertical sliding movement on the swiveled rods 37, the latter adapted to raise and lower with the movement of the shovel beams when they are depressed into the ground or raised therefrom.

The use of the guiding lever and its connection with the shovel beams, together with the improvements in the said lever, swiveled attachments to the beams and improved bracket arms on the axle produce practically the same result, only with more convenience and with better advantage, as do the devices in the patent and application heretofore referred to; that of doing away with all foot work on the part of the driver, for guiding the shovel beams.

The advantage of the swiveled rods 37 on which the castings 40 are vertically movable, is, that there is danger of the chains 56 tightening as the beams are swung and to obviate this danger, the castings 40 are carried by the rods 37, which, being swiveled to their supports, they will oscillate and give to the movement of the chains as they are drawn taut by the movement of the beams and prevent their snapping.

Changing the pivot of the lever 17 from a point at or near its outer ends, as in the patent and application referred to, to a point beneath the axle and shortening the same so as to carry the chains 56 from the beams around guide rollers supported or suspended from the end of the said lever, when it is desired to move or swing the beams, the handle of the lever is moved in the direction in which it is desired to move the beams. For instance, if it is desired to swing the shovels to the left, the lever will be swung in a corresponding direction, an advantage not shown or obtained by either the patent or the application referred to.

Another advantage of this lever, is in its folding section, to which is suitably connected the slidable plate 27, to which is attached the ends of the chains 56. In raising the beams, the chains 56 are drawn with them through the guiding sheave wheels 55, and to permit slack in these chains to enable a free and easy movement of the beams in raising, the operator will throw the section 21 of the lever forward and through the rod 31 connected therewith and with the plate 27, the latter is advanced on the lever section 20 which produces slack in the chain and allows the chain to give to the movement of the beams in raising. The folding of the handle which is a part of the section 21 of the lever, the handle will not interfere with the driver in getting on or off the cultivator.

In addition to the advantages above enumerated, the improvements contain all of the advantages of either the patent or application referred to. And it will be obvious from the foregoing that changes may be made and the application of the device modified to adapt it to various styles and forms of cultivators, and I do not wish to be confined to the exact details herein.

Having thus fully described my invention, what I claim and desire to secure by Letters Patent of the United States, is:—

1. In a cultivator, the combination with the shovel beams, a lever pivoted for horizontal movement, attachments having a swiveled connection with said beams, members vertically movable on said attachments and connections between said members and said lever.

2. In a cultivator, the combination with the shovel-beams, of a lever, flexible connections between the forward end of said lever and with the said beams, the oscillation of the lever imparting a movement to the beams corresponding to the direction of movement of the handle of the said lever.

3. In a cultivator, the combination with the shovel-beams, a lever having a folding handle section, attachments connected with the beams, sheave wheels adjustable on the said attachments, and chains connected with the lever and with the said wheels.

4. In a cultivator, the combination with the shovel-beams, a lever having a folding handle section, a plate slidable on the forward section of said lever, connections between the plate and handle section, and connections between the plate of the lever and said beams.

5. In a cultivator, the combination with the shovel-beams, a lever having a pivoted section adapted to be swung forwardly, a plate slidable on the forward lever section, connections between the plate and pivoted lever section, adjustable attachments on the beams and connections between the plate of said lever and beam attachments.

6. In a cultivator, the combination with the shovel-beams, a lever having a folding handle section, a plate slidable on the forward section of said lever, connections between the plate and handle section, guide rollers connected with the forward end of the lever, chains connected with the sliding plate of the lever and beams, and passing over the guide rollers of the lever.

7. In a cultivator, the combination with the shovel beams, chains suitably connected to the said beams, a lever and connections between the said lever and beams, and means on the lever for producing slack in the said chains.

8. In a cultivator, the combination with the shovel-beams, a lever, a slidable plate on the said lever, chains connected to the said plate and beams, guide rollers on the end of the lever over which the chains are carried, and means for sliding said plate and thereby producing slack in the said chains.

9. In a cultivator, the combination with the shovel-beams, a bracket supported by the axle, a lever pivotally connected to the said bracket, swiveled attachments connected to the beams, and chains connected at one end to said attachments and having their opposite ends secured to the lever.

10. In a cultivator, the combination with the shovel-beams, a bracket supported by the axle, a lever pivotally connected to the said bracket, swiveled attachments connected to the beams, sheave wheels adjustable on said attachments, chains connected to the lever and to said wheels, and guides for the said chains.

11. In a cultivator, an attachments for the axle, consisting of a bracket-arm having a series of perforations and provided with a hook at its lower end, a bracket having engagement with the axle and with which the upper end of the bracket-arm may be adjustably connected, and a second bracket connected to the axle with which the bracket-arm may be pivotally connected.

12. In a cultivator, the combination with the shovel-beams, a pair of brackets suitably engaging the vertical portions of the axle one above the other, bracket arms pivotally connected with the lower brackets of the axle and adjustably connected at their upper ends with the upper brackets, a lever, chains connected with the lever and with the beams, and guide wheels for the chains supported by the lower ends of the bracket-arms.

13. In a cultivator, the combination with the shovel-beams, a pair of brackets suitably engaging the vertical portions of the axle one above the other, bracket arms pivotally connected with the lower brackets of the axle and adjustably connected at their upper ends with the upper brackets, a lever, swiveled attachments connected with the beams, chains connected with the lever and with the said attachments, and guide wheels for the chains supported by the lower ends of the bracket-arms.

14. In a cultivator, the combination with the shovel-beams, a pair of brackets suitably engaging the vertical portions of the axle one above the other, bracket-arms pivotally connected with the lower brackets of the axle and adjustably connected at their upper ends with the upper brackets, a lever, a sliding plate on the lever, chains attached to the plate of the lever and the beams, guide wheels for the chains on the end of the lever and guide wheels for the chains supported by the lower ends of the bracket-arms.

15. In a cultivator, the combination with the shovel beams, a lever, chains connecting one end of said lever with said beams, said lever adapted to be swung into a position for the purpose of producing slack in the chains.

16. In a cultivator, the combination with the shovel beams, a lever having a jointed section connected therewith, chains connected with said beams, and suitably connected with the jointed section of said lever, whereby when said jointed section is oscillated, slack may be produced in the said chains.

17. In a cultivator, the combination with the shovel beams, a lever, chains suitably connected to said lever and also to said beams, guiding means on one end of the lever over which said chains are carried, said lever adapted to be swung into a position for the purpose of producing slack in the chains.

In testimony whereof I affix my signature, in presence of two witnesses.

THOMAS MULALLY.

Witnesses:
EDWARD AUTEN, Jr.,
SADIE M. CHASE.